United States Patent [19]

Williams

[11] 4,099,589

[45] Jul. 11, 1978

[54] DC ELECTRIC CAR WITH AUXILIARY POWER AND AC DRIVE MOTOR

[75] Inventor: James R. Williams, Irving, Tex.

[73] Assignee: Trans Research Development Corporation, Dallas, Tex.

[21] Appl. No.: 752,539

[22] Filed: Dec. 20, 1976

[51] Int. Cl.² .............................................. B60K 9/04
[52] U.S. Cl. .................................... 180/65 A; 290/45
[58] Field of Search ................ 180/65 R, 65 A, 65 C, 180/54 R, 54 F; 290/16, 17, 22, 31, 45

[56] References Cited

U.S. PATENT DOCUMENTS

| 827,766 | 8/1906 | Weiss | 180/65 A |
|---|---|---|---|
| 2,666,492 | 1/1954 | Nims et al. | 180/65 A |
| 3,367,438 | 2/1968 | Moore | 180/65 A |
| 3,566,717 | 3/1971 | Berman et al. | 180/65 X |
| 3,796,278 | 3/1974 | Shibata | 180/65 A |
| 3,923,115 | 12/1975 | Helling | 180/65 A |

Primary Examiner—Joseph F. Peters, Jr.
Assistant Examiner—Gene A. Church
Attorney, Agent, or Firm—Hubbard, Thurman, Turner, Tucker & Glaser

[57] ABSTRACT

An electric car is provided with a DC drive motor powered by a conventional storage battery and an AC drive motor powered by the combination of an AC generator driven by an auxiliary internal combustion engine. The car may be driven by the DC motor alone, for example during short range stop and go driving, or it may be driven by the AC motor alone, for example during relatively constant speed long range driving, or it may be driven by both motors in combination when increased power is required.

4 Claims, 2 Drawing Figures

DC ELECTRIC CAR WITH AUXILIARY POWER AND AC DRIVE MOTOR

BACKGROUND OF THE INVENTION

1. Field of the Invention

This invention relates generally to electric cars, and more particularly to a drive system for an electric car which includes a DC drive motor, an AC drive motor, and an auxiliary engine which powers the AC drive motor through an alternator.

2. Description of the Prior Art

The conventional electric car includes a DC motor energized through a power controller by a bank of direct current storage batteries and a transmission for propelling traction wheels which is driven by the DC motor. The range of the conventional electric car is limited by factors such as the weight of the vehicle, aerodynamic drag, the energy storage capability of its batteries, and the efficiency of the drive motor and other equipment powered by its batteries.

One approach to extending the effective travel range is to provide an auxiliary internal combustion engine, a battery charging system and two banks of series-connected batteries which are periodically switched between operating and charging service as disclosed in U.S. Pat. No. 3,874,472. In that arrangement, one bank of batteries is charged by the auxiliary internal combustion engine as the other bank of batteries energizes a direct current drive motor. By switching the two groups of batteries between operating and charging service at regular intervals, the effective range of continuous travel is substantially increased.

U.S. Pat. No. 3,650,345 discloses an arrangement including an internal combustion engine which extends the effective travel range of an electric car wherein the traction wheels are driven at low speeds by electric energy stored in a battery and at high speeds by the internal combustion engine which simultaneously recharges the battery.

SUMMARY OF THE INVENTION

Under certain driving conditions, for example when transporting an unusually heavy load or when traveling in mountainous regions, increased power is desired in addition to an extended travel range. The prior art arrangements cited above utilize an auxiliary internal combustion engine for extending the effective travel range of an electric car but make no provision for increasing the load transporting ability of the vehicle. According to the present invention, an auxiliary internal combustion engine is combined with an alternating current generator and an alternating current induction motor to provide increased power output for relatively heavy load conditions as well as extending the effective travel range of the vehicle. During short range travel, for example during stop and go city driving, the electric car is driven by a DC electric motor which is energized by a bank of storage batteries. During long range, relatively constant speed driving, for example during cross-country driving, the car is driven by an AC motor which is powered by an alternating current generator which is driven by an auxiliary internal combustion engine. The output of the alternating current generator is rectified and is used to recharge the bank of storage batteries during this period. The shafts of the AC motor and of the DC motor are mechanically connected together so that they may drive the transmission of the car simultaneously when increased power or torque is required, for example when starting under a relatively heavy load, or when climbing a steep grade for a relatively long period of time.

BRIEF DESCRIPTION OF THE DRAWING

The invention will be more fully understood from the following detailed description, taken in connection with the accompanying drawing, in which.

DETAILED DESCRIPTION

Figure 1:
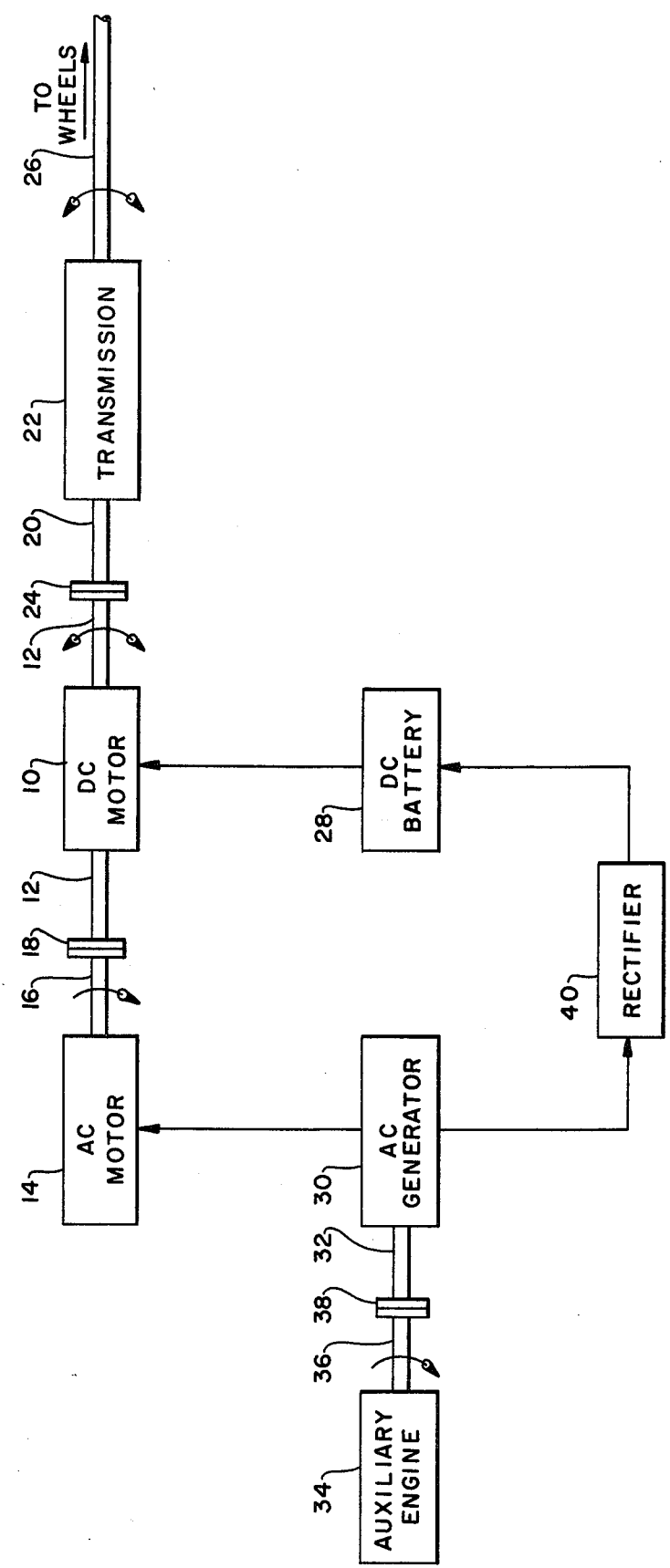
FIG. 1 is a block diagram of the invention.

Referring now to FIG. 1, a drive system suitable for propelling the traction wheels of an electric car is illustrated. The system includes a DC electric motor 10 which serves as a first prime mover and which is equipped with a rotatable shaft 12 for transmitting torque. The drive system also includes an alternating current electric motor 14 which serves as a second prime mover for the system and which is also equipped with a rotatable shaft 16 for transmitting torque. The shaft 16 of the alternating current motor 14 is mechanically coupled to the shaft 12 of the DC motor 10 by means of a coupler 18 for concurrent rotation. The opposite end of the shaft 12 of the DC motor 10 is mechanically connected to a first propeller shaft 20 of a suitable automotive transmission 22 by means of a coupler 24. The transmission 22 may include a differential gear assembly for propelling the traction wheels in the forward and reverse directions and at selected fixed speeds through a second propeller shaft 26.

The DC motor 10 is energized in the conventional manner by means of a bank 28 of direct current storage batteries which are interconnected to provide an energizing current output at a predetermined voltage potential, for example thirty-six volts.

The alternating current motor 14 is energized by an alternating current generator 30 which includes a rotatable power input shaft 32. The alternating current generator is driven by an auxiliary internal combustion engine 34 which includes a rotatable power output shaft 36. The output shaft 36 and the power input shaft 32 of the alternating current generator 26 are mechanically connected together by a coupler 38 so that torque produced by the auxiliary engine 34 is efficiently transmitted to rotate the power input shaft 32 of the alternating current generator 30. The auxiliary engine may be relatively low horsepower rating, for example ten horsepower, and the alternating current generator may have a power output rating of four KW at 36 volts. The output of the alternating current generator 30 is also connected to energize a rectifier 40 which is operable to convert alternating current to direct current. The output of the rectifier 40 is used to charge the DC battery 28 in the conventional manner.

Figure 2:
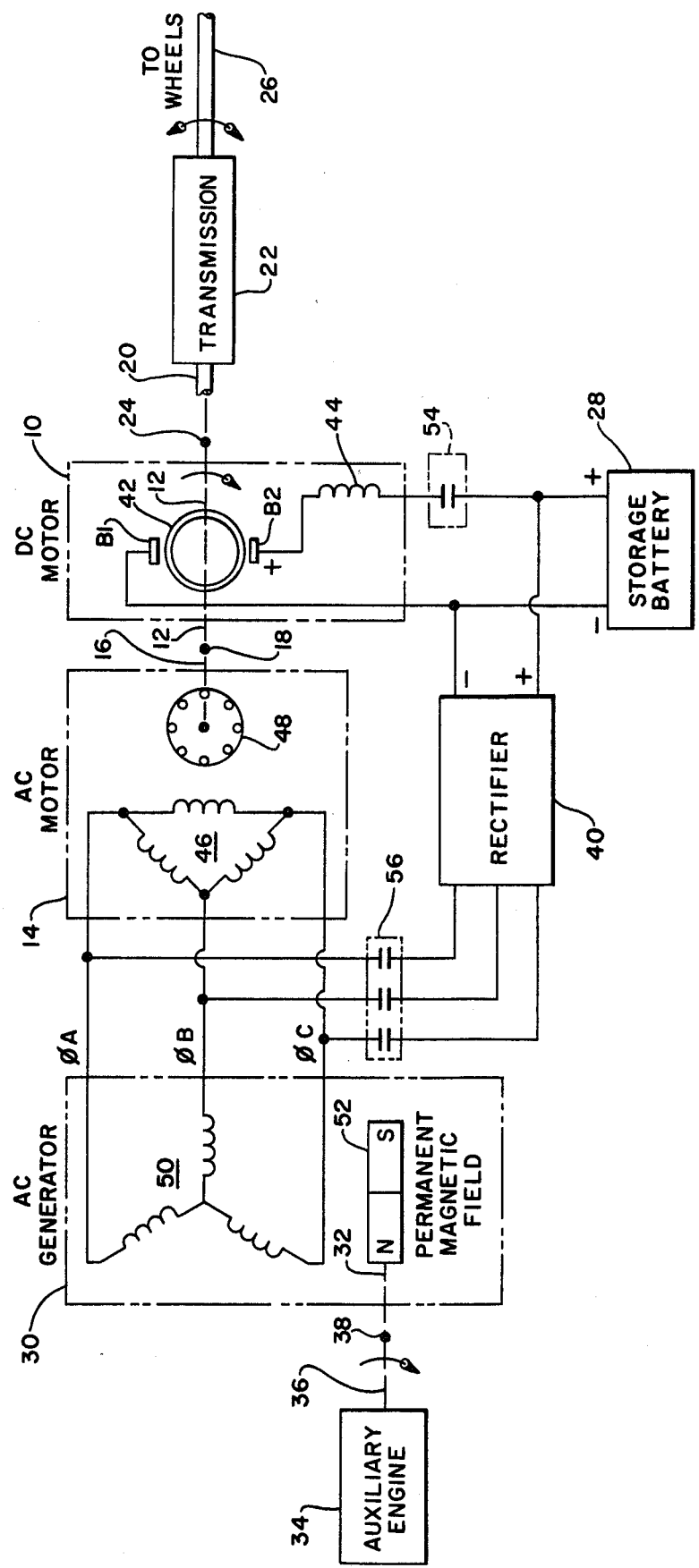
FIG. 2 is an electrical circuit diagram which illustrates a preferred embodiment of the invention.

Referring now to FIG. 2 of the drawing, a preferred embodiment is disclosed in which details of the electrical circuit connections are illustrated. The DC motor 10 includes an armature rotor assembly 42 and a pair of commutator brushes B1, B2. The DC motor 10 may be excited by any conventional shunt, series, or compound arrangement, depending upon the desired operating characteristics. The most desirable traction torque-speed operating characteristic for an electric vehicle is high initial torque at zero or low speed and a decreasing torque as speed increases. The series excited DC motor approximates that operating characteristic. In FIG. 2, the DC motor 10 is connected in a series arrangement which includes a series field winding 44.

The AC motor 14 is an induction motor which includes a three-phase stator input winding 46 and a squirrel cage rotor assembly 48 which is inductively coupled to the rotating magnetic field produced by the flow of three-phase current through the stator winding 46. The AC motor 14 is generally more reliable than the DC motor 10 since it does not require commutators or brushes.

Power for energizing the three-phase induction motor 14 is produced by the AC generator 30 which includes a three-phase stator winding 50 which produces three balanced output phases, phase A, phase B, and phase C, which are displaced in time by 120 degrees. The AC generator 30 is excited by means of a permanent magnet rotor field assembly 52 which is driven by the auxiliary internal combustion engine 34 through the shafts 32 and 36.

According to an important feature of the invention, the shaft 16 of the AC motor 14 and the shaft 12 of the DC motor 10 are directly connected together for concurrent rotation so that the transmission 22 may be driven by the DC motor alone, by the AC motor alone, or by the combination of the AC motor 14 and the DC motor 10 operating simultaneously to provide increased torque or output power as required by driving conditions. When only one motor is energized, a slight mechanical load is imposed on the system by the rotor assembly of the de-energized motor. This load is partly offset by the beneficial flywheel inertia effect of its rotating mass.

In the usual operation of an electric car which includes this electric drive arrangement, only the DC motor 10 will be energized and the auxiliary engine 34 will be turned off. It is anticipated that this mode of operation will be commonly used for average loading conditions and relatively short range stop and go travel as in city driving. However, during trips of relatively longer duration when the storage battery 28 is likely to be discharged before completion of the travel, the DC motor 10 is turned off by opening a power contactor 54 which is electrically connected in series between the positive power output terminal of the storage battery 28 and to the positive field terminal of the motor 10. During this mode of operation, the transmission 22 is driven by the AC motor 14 which is energized by the auxiliary engine 34 and AC generator 30. If desired, the storage battery 28 can be charged during this period by connecting the three-phase output of the AC generator 30 through a three-pole contactor 56 to energize the rectifier 40.

A further advantage provided by utilizing an AC induction motor in combination with a DC motor is that the AC induction motor is inherently more reliable and more rugged than the DC motor since it does not utilize commutator brushes to develop torque through its output shaft as does the DC motor 10. Thus the AC motor may be used to drive the transmission 22 in the event of a brush failure or some other electrical failure of the DC motor 10.

It is sometimes necessary to transport heavier than usual loads or to travel over relatively steep inclines, for example such as found in mountain driving. The increased loading imposed by such driving conditions can be met by driving the transmission 22 simultaneously by the DC motor 10 in combination with the AC motor 14. In this arrangement, the auxiliary internal combustion engine 34 is turned on and causes the permanent magnet rotor field assembly 52 to rotate. The rotating magnetic field induces three-phase currents $\phi_A$, $\phi_B$, and $\phi_C$ to flow through the stator winding 50 of the AC generator 30. These currents energize the stator winding 46 of the AC motor 14 to create a rotating magnetic field which causes the squirrel cage rotor 48 of the AC motor to rotate. The torque output of the AC motor 14 is added directly to the torque output of the DC motor 10 since the shaft 16 of the AC motor and the shaft 12 of the DC motor are directly coupled together.

The electrical drive arrangement described above represents an improvement over prior art drive arrangements in that it provides increased power output for heavy loading conditions and improved reliability in addition to an extended range of travel.

Although a preferred embodiment of the invention has been described in detail, it should be understood that various changes, substitutions, or alterations can be made therein without departing from the spirit and scope of the invention as defined by the appended claims.

What is claimed is:

1. In combination with an electrically powered motor vehicle of the type including a direct current storage battery and a direct current motor having an electrical input circuit connected to receive direct current from the battery and having a rotatable shaft mechanically coupled to drive traction wheels, the improvement which comprises:

an alternating current motor having an input circuit for receiving alternating current and a rotatable shaft mechanically coupled to drive the traction wheels in response to the flow of alternating current through the input circuit of the alternating current motor;

an alternating current generator having a rotatable shaft and an electrical output circuit connected to energize the input circuit of the alternating current motor, the generator being operable to produce alternating current in response to mechanical rotation of the generator shaft; and, an internal combustion engine mechanically coupled to drive the generator shaft.

2. The combination as defined in claim 1, further including:

a rectifier operable to convert alternating current to direct current having an input circuit electrically connected to receive alternating current produced by the generator, and having an output circuit connected to charge the storage battery with direct current.

3. The combination as defined in claim 2, further including:

first power contactor means electrically connected between the storage battery and the direct current motor for selectively energizing or de-energizing the direct current motor; and, second power contactor means electrically connected between the electrical output circuit of the alternating current generator and the input circuit of the rectifier for selectively energizing or de-energizing the rectifier.

4. The combination as defined in claim 1 wherein the rotatable shaft of the alternating current motor is mechanically connected in tandem relation to the rotatable shaft of the direct current motor for concurrent rotation therewith.

* * * * *